United States Patent Office 3,580,709
Patented May 25, 1971

3,580,709
GLASS TREATMENT WITH DISCRETE AREAS

Peter Baldwin Banks, Essex, England, assignor to English Electric Valve Company Limited, London, England No Drawing. Filed Sept. 7, 1967, Ser. No. 665,995
Claims priority, application Great Britain, Sept. 14, 1966, 41,116/66
Int. Cl. C03c *15/00;* C03b *29/00*
U.S. Cl. 65—30 7 Claims

ABSTRACT OF THE DISCLOSURE

In the production of a glass target of an image orthicon a target of Elcon glass is first prepared in oxidising conditions. A thin layer of metal is then deposited through a fine mesh onto one side of the target to produce a mosaic of separated discrete area deposits. The target is finally differentially heated from the side remote from that on which the metal was deposited to raise the temperature of the glass at the discrete areas to about the softening point to render it conductive at those areas without changing the conductivity at the boundaries of the areas.

This invention relates to television and like camera tubes and more specifically to image orthicon and similar tubes of the kind employing a glass target upon which an electrical charge image representative of a subject of transmission is stored and scanned by a cathode ray to develop picture signals.

As is well known the resolving power of a known image orthicon or similar tube of the kind referred to and as at present in common use, is undesirably limited, more especially when used to "view" an optical image of low light level, by reason of the fact that the charges stored by the glass target leak away sideways because of the finite conductivity of the glass material employed. The present invention seeks to reduce this limitation by providing a double sided glass mosaic target of such a nature as to present the required conductivity through the thickness of the glass target at discrete areas thereof, each such area being, however, bounded by a region of such very low conductivity that the target as a whole has, practically speaking, zero or near zero conductivity laterally so that charges stored at the discrete areas will not leak away laterally for a relatively long time.

The invention consists in the provision of certain methods of treating glass material which contains, as an essential component, titanium oxide or niobium oxide. Such glass material is at present employed for the targets of certain image orthicon tubes known under the trademark "Elcon." For the sake of brevity such glass material will hereinafter be referred to as "Elcon" glass. The methods provided by this invention convert an Elcon glass target of practically zero conductivity into a target which has limited conductivity through the thickness of the glass at discrete areas thereof, and very low, practically zero conductivity laterally from each area to its neighbours.

Elcon glass, if prepared in oxidising condition, has an electrical conductivity which is so very low as to be hardly measurable whereas, if it is prepared in conditions which are sufficiently reducing to convert a subtantial proportion of the titanium (in the case of Elcon glass containing titanium oxide) from the quadrivalent to the trivalent state, or a substantial proportion of the nobium (in the case of Elcon glass containing niobium oxide) from the pentavalent to the quadrivalent state, it has a substantially increased conductivity of the order of $10^{11}$ ohm cms., the exact value depending on the proportion of $TiO_2$ in the glass and the extent to which reduction has occurred.

According to the invention a method of making the glass target of a television camera tube of the kind referred to comprises the steps of preparing a target of Elcon glass in oxidising conditions; depositing metal through a fine mesh on to one side of the target to produce a mosaic of separate discrete areas on that side; and rendering the glass of the target conductive where said areas occur without substantially changing the conductivity at the boundaries of said areas by a process which includes differentially heat treating the glass to raise the temperature at said areas to a value at which change of conductivity occurs while leaving the temperature at said boundaries below that value.

There are two ways of rendering the glass at the discrete areas conductive as a result of differential heating namely (1) by chemical reduction by heating in contact with a reducing material and (2) by devitrification by heat treatment.

In one way of carrying out the invention an Elcon glass target, assumed, for simplicity, to be one containing titanium oxide, is first prepared in oxidising conditions. A suitable constitution for the glass which has been successfully used in experimental practice is 60% BaO, 20% $B_2O_3$ and 20% $TiO_2$ by weight. A very thin layer of titanium is than evaporated on to one side of the target through a fine mesh mask placed in close proximity to the glass to produce a moaic of separated discrete area metal deposits. The target is then heated for about 10 minutes by radiation in vacuo from the side opposite to that upon which the metal has been deposited. The heating is such as to raise the temperature of the glass at the discrete areas to about the softening point and render it conductive at those areas. The rendering of the glass conductive at said areas when so heat treated is believed to be caused by chemical reaction between the glass and the metal and although the exact mechanism of the reaction is not known it is probable that it is the result of diffusion of titanium into the glass or of diffusion of oxygen out of the glass, or both. Heating by radition from the side of the target opposite to that on which the metal has been deposited avoids the production of conductivity in the unmetallised areas of the glass—i.e. the boundaries of the discrete areas—by lateral spreading, because, owing to the reflecting power of the metal, the metal coated areas are raised to a higher temperature than the uncoated areas. By suitably choosing the intensity of heating, it is possible to raise the temperature of the coated areas (these will normally be square in shape) slightly above the softening temperature of the glass and producing conductivity at those areas, while the boundaries of said areas (the "shadow" pattern of the mesh through which the metal was deposited) remain below the softening temperature so that they "hold up" the glass target during the heating process and do not take part in the reaction which produces conductivity in the coated areas. The result is, accordingly, a target or membrane of discrete areas of through-conductivity separated by boundaries of substantially zero conductivity. Such a target or membrane has, as a whole, zero or almost zero electrical leakage laterally.

In a modification of the above described method of manufacture, localised devitrification of the glass at the discrete areas is employed instead of chemical reaction to produce the required conductivity at said areas. Devitrification of Elcon glass will produce an increase of conductivity of about 6 orders of magnitude. In this modified process the principle of differential heating of different parts of the glass target is again employed, the discrete areas being raised to the temperature required for devitrification while the boundaries of said areas remain below that temperature. As before the differential heating may be obtained by providing a metal mosaic on one side of the target and heating it in vacuo by radiation from the other side.

I claim:

1. A method of making the glass target of a television camera tube of the kind employing a glass target upon which an electrical charge image representative of a subject of transmission is stored and scanned by a cathode ray to develop picture signals including the steps of preparing a target of electronicallyy conducting glass having as an essential component a member of the group consisting of titanium oxide and niobium oxide in an amount sufficient to cause a change in conductivity upon heating in oxidizing conditions; depositing metal through a fiine mesh onto one side of the target to produce a mosaic of separate discrete areas on that side, the deposited metal forming the boundaries of said discrete areas; and rendering the glass of the target conductive where aid areas occur without substantially changing the conductivity at the boundaries of said areas by heating the target from the side opposite to the mosaic in vacuo thereby causing the temperature of the glass to be raised at said discrete areas to a value at which a change of conductivity occurs thereat while leaving the temperature at said boundries below that value, said metal being a suitable refractory metal having good heat-reflecting properties and the property of suitably adhering to glass.

2. A method as claimed in claim 1 wherein the glass at the discrete areas is rendered conductive by chemical reduction by heating in contact with a reducing material.

3. A method as claimed in claim 1 wherein the glass at the discrete areas is rendered conductive by devitrification by heat treatment.

4. The method of claim 1 wherein said metal is titanium or niobium.

5. The method of claim 4 wherein said metal is deposited by evaporation.

6. The method of claim 5 wherein the said temperature of the glass is raised at said discrete areas to the softening point of the glass.

7. The method of claim 5 wherein the said temperature of the glass is raised at said discrete areas to the devitrification temperature of the said glass.

References Cited

UNITED STATES PATENTS

| | | | |
|---|---|---|---|
| 2,633,543 | 3/1953 | Howatt | 106—39 |
| 3,084,053 | 4/1963 | Arlett | 106—39 |
| 3,193,408 | 7/1965 | Triller | 117—107 |
| 3,205,855 | 9/1965 | Ault | 117—107 |

FRANK W. MIGA, Primary Examiner

U.S. Cl. X.R.

65—32, 33, 60; 106—39; 117—107, 124